United States Patent
Hirayama et al.

(10) Patent No.: US 10,006,680 B2
(45) Date of Patent: Jun. 26, 2018

(54) EVAPORATOR WITH COOL STORAGE FUNCTION

(71) Applicant: KEIHIN THERMAL TECHNOLOGY CORPORATION, Oyama-shi (JP)

(72) Inventors: Takashi Hirayama, Oyama (JP); Osamu Kamoshida, Oyama (JP)

(73) Assignee: KEIHIN THERMAL TECHNOLOGY CORPORATION, Oyama-Shi (JP)

(*) Notice: Subject to any disclaimer, the term of this patent is extended or adjusted under 35 U.S.C. 154(b) by 459 days.

(21) Appl. No.: 14/135,591

(22) Filed: Dec. 20, 2013

(65) Prior Publication Data

US 2014/0174121 A1    Jun. 26, 2014

(30) Foreign Application Priority Data

Dec. 25, 2012 (JP) .................. 2012-280861

(51) Int. Cl.
*F28D 20/02* (2006.01)
*F25B 39/02* (2006.01)
(Continued)

(52) U.S. Cl.
CPC ............ *F25B 39/02* (2013.01); *F25B 39/022* (2013.01); *F28D 1/0333* (2013.01); *F28D 20/02* (2013.01);
(Continued)

(58) Field of Classification Search
CPC .... F25B 39/02; F25B 2400/24; F25B 39/024; F28D 20/02; F28D 20/026; F28D 2020/0008; F28D 2020/0013
See application file for complete search history.

(56) References Cited

U.S. PATENT DOCUMENTS 4,350,025 A * 9/1982 Izumi .................. F24F 13/22
                                                          3/22
4,570,700 A * 2/1986 Ohara .................. F25B 39/02
                                                          165/134.1

(Continued)

FOREIGN PATENT DOCUMENTS

JP    04-155191    5/1992
JP    11-118099    4/1999
(Continued)

OTHER PUBLICATIONS

Japanese Office Action for corresponding JP Application No. 2012-280861, dated Aug. 23, 2016.

*Primary Examiner* — Ljiljana Ciric
*Assistant Examiner* — Alexis Cox
(74) *Attorney, Agent, or Firm* — Mori & Ward, LLP

(57) ABSTRACT

An evaporator with a cool storage function includes a plurality of refrigerant flow tubes. The flow tubes are spaced apart from one another in a thickness direction to form spaces among the plurality of refrigerant flow tubes. Outer fins are disposed in a first part of the spaces and are joined to the plurality of refrigerant flow tubes. The cool storage material container contains a cool storage material and is disposed in a second part of the spaces other than the first part. An inner fin is disposed within the cool storage material container and has crest portions extending along a longitudinal direction of the flow tubes, trough portions extending along the longitudinal direction, and connection portions connecting the crest portions and the trough portions.

12 Claims, 9 Drawing Sheets

(51) Int. Cl.
   *F28D 1/03*      (2006.01)
   *F28D 1/053*     (2006.01)
   *F28D 21/00*     (2006.01)
   *F28D 20/00*     (2006.01)

(52) U.S. Cl.
   CPC ...... *F25B 2400/24* (2013.01); *F28D 1/05391* (2013.01); *F28D 2020/0013* (2013.01); *F28D 2021/0085* (2013.01); *Y02E 60/145* (2013.01)

(56) References Cited

U.S. PATENT DOCUMENTS

| | | | | |
|---|---|---|---|---|
| 4,615,383 | A * | 10/1986 | Hisao | F25B 39/02 165/150 |
| 4,914,929 | A * | 4/1990 | Shimazaki | B60H 1/00521 165/69 |
| 5,532,039 | A * | 7/1996 | Payne | B32B 3/12 126/618 |
| 5,826,646 | A * | 10/1998 | Bae | F28F 3/04 165/110 |
| 8,495,894 | B2 * | 7/2013 | Kerler | F28D 1/05391 165/10 |
| 8,806,890 | B2 * | 8/2014 | Takagi | B60H 1/00335 62/515 |
| 8,935,936 | B2 * | 1/2015 | Karl | F25B 39/022 62/243 |
| 2004/0159121 | A1 * | 8/2004 | Horiuchi | F25B 39/02 62/526 |
| 2007/0095514 | A1 * | 5/2007 | Inoue | B21D 53/02 165/177 |
| 2008/0028788 | A1 * | 2/2008 | Higashiyama | F25B 39/02 62/515 |
| 2008/0041095 | A1 * | 2/2008 | Higashiyama | F25B 39/02 62/515 |
| 2008/0173434 | A1 * | 7/2008 | Matter | F28D 1/0417 165/150 |
| 2009/0173478 | A1 * | 7/2009 | Beamer | F25B 39/02 165/151 |
| 2009/0266104 | A1 * | 10/2009 | Ichiyanagi | F25B 39/00 62/498 |
| 2011/0154855 | A1 * | 6/2011 | Sasaki | F25B 39/022 62/524 |
| 2012/0042687 | A1 * | 2/2012 | Kamoshida | F25B 39/02 62/524 |
| 2012/0204597 | A1 | 8/2012 | Karl et al. | |
| 2013/0047663 | A1 * | 2/2013 | Kamoshida | F25B 39/02 62/524 |
| 2013/0212881 | A1 * | 8/2013 | Kamoshida | B23K 1/0012 29/890.07 |
| 2013/0255303 | A1 * | 10/2013 | Sato | B64G 1/50 62/315 |
| 2013/0255926 | A1 * | 10/2013 | Hirayama | F28F 1/00 165/173 |
| 2013/0284395 | A1 * | 10/2013 | Kamoshida | F28D 20/00 165/10 |
| 2014/0165647 | A1 * | 6/2014 | Hirayama | F25B 39/022 62/515 |
| 2014/0182330 | A1 * | 7/2014 | Kamoshida | F25B 39/022 62/524 |
| 2015/0121945 | A1 * | 5/2015 | Kamoshida | F25B 39/022 62/434 |
| 2015/0360534 | A1 * | 12/2015 | Higashiyama | B60H 1/005 62/430 |

FOREIGN PATENT DOCUMENTS

| | | |
|---|---|---|
| JP | 2011/0154855 | 8/2011 |
| JP | 2012-042167 | 3/2012 |
| JP | 2012-193867 | 10/2012 |

* cited by examiner

EVAPORATOR WITH COOL STORAGE FUNCTION

CROSS-REFERENCE TO RELATED APPLICATIONS

The present application claims priority under 35 U. S. C. § 119 to Japanese Patent Application No. 2012-280861, filed Dec. 25, 2012. The contents of this application are incorporated herein by reference in their entirety.

BACKGROUND OF THE INVENTION

Field of the Invention

The present invention relates to an evaporator with a cool storage function.

Discussion of the Background

In recent years, in order to protect the environment and improve fuel consumption of automobiles, there has been proposed an automobile designed to automatically stop the engine when the automobile stops, for example, to wait for a traffic light to change.

However, an ordinary car air conditioner has a problem in that, when an engine of an automobile in which the air conditioner is mounted is stopped, a compressor driven by the engine is stopped, and supply of refrigerant to an evaporator stops, whereby the cooling capacity of the air conditioner drops sharply.

As one measure to solve such a problem, imparting a cool storage function to the evaporator has been considered, to thereby enable cooling of a vehicle compartment by releasing the cool stored in the evaporator, when the compressor stops as a result of stoppage of the engine.

The present applicant has proposed evaporators with a cool storage function (see Japanese Patent Application Laid-Open (kokai) No. 2011-149684). In the proposed evaporators, a plurality of flat refrigerant flow tubes which extend in the vertical direction and whose width direction coincides with an air-passing direction are disposed between a pair of tanks spaced from each other in the vertical direction such that the refrigerant flow tubes are spaced from one another in the thickness direction thereof. The evaporator has clearances each formed between adjacent refrigerant flow tubes. Cool storage material containers filled with a cool storage material are disposed in some clearances, and outer fins are disposed in the remaining clearances. Each cool storage material container has a container main body portion joined to the corresponding refrigerant flow tubes, and an outward projecting portion which extends from the leeward edge of the container main body portion over the entire length thereof in the vertical direction and which projects beyond the refrigerant flow tubes with respect to the air-passing direction. An inner fin is disposed in each cool storage material container such that the inner fin extends from the container main body to the outward projecting portion. In one of the proposed evaporators, the inner fin has a staggered shape, and is formed by connecting together a plurality of wavy strips juxtaposed in an air-passing direction. Each of the strips has crest portions extending in the air-passing direction, trough portions extending in the air-passing direction, and connection portions connecting the crest portions and the trough portions. The strips are disposed such that the crest portions and the trough portions of one of two wavy strips located adjacent to each other in the air-passing direction are positionally shifted in the vertical direction from the crest portions and the trough portions of the other wavy strip. In the other proposed evaporator, the inner fin has a corrugated shape and is composed of crest portions extending in the air-passing direction, trough portions extending in the air-passing direction, and connection portions connecting the crest portions and the trough portions.

However, in the case where the evaporators with a cool storage function disclosed in the publication are used for a car air conditioner of an automobile, when the cool storage material within the cool storage material containers is in the liquid phase, an usual sound may be produced because the liquid-phase cool storage material greatly moves in the air-passing direction within the cool storage material containers due to shaking or vibration of the automobile.

SUMMARY OF THE INVENTION

According to one aspect of the present invention, an evaporator with a cool storage function includes a plurality of flat refrigerant flow tubes, outer fins, at least one cool storage material container, and an inner fin. The plurality of flat refrigerant flow tubes have a longitudinal direction and a width direction which is perpendicular to the longitudinal direction and along which air is to pass. The plurality of flat refrigerant flow tubes are disposed in parallel and spaced apart from one another in a thickness direction of the plurality of refrigerant flow tubes to form spaces among the plurality of flat refrigerant flow tubes. The thickness direction is perpendicular to the longitudinal direction and the width direction. The outer fins are disposed in a first part of the spaces and joined to the plurality of refrigerant flow tubes. The cool storage material container contains a cool storage material and is disposed in a second part of the spaces other than the first part. The inner fin is disposed within the cool storage material container and has crest portions extending along the longitudinal direction, trough portions extending along the longitudinal direction, and connection portions connecting the crest portions and the trough portions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

An embodiment of the present invention will next be described with reference to the drawings.

Figure 2:
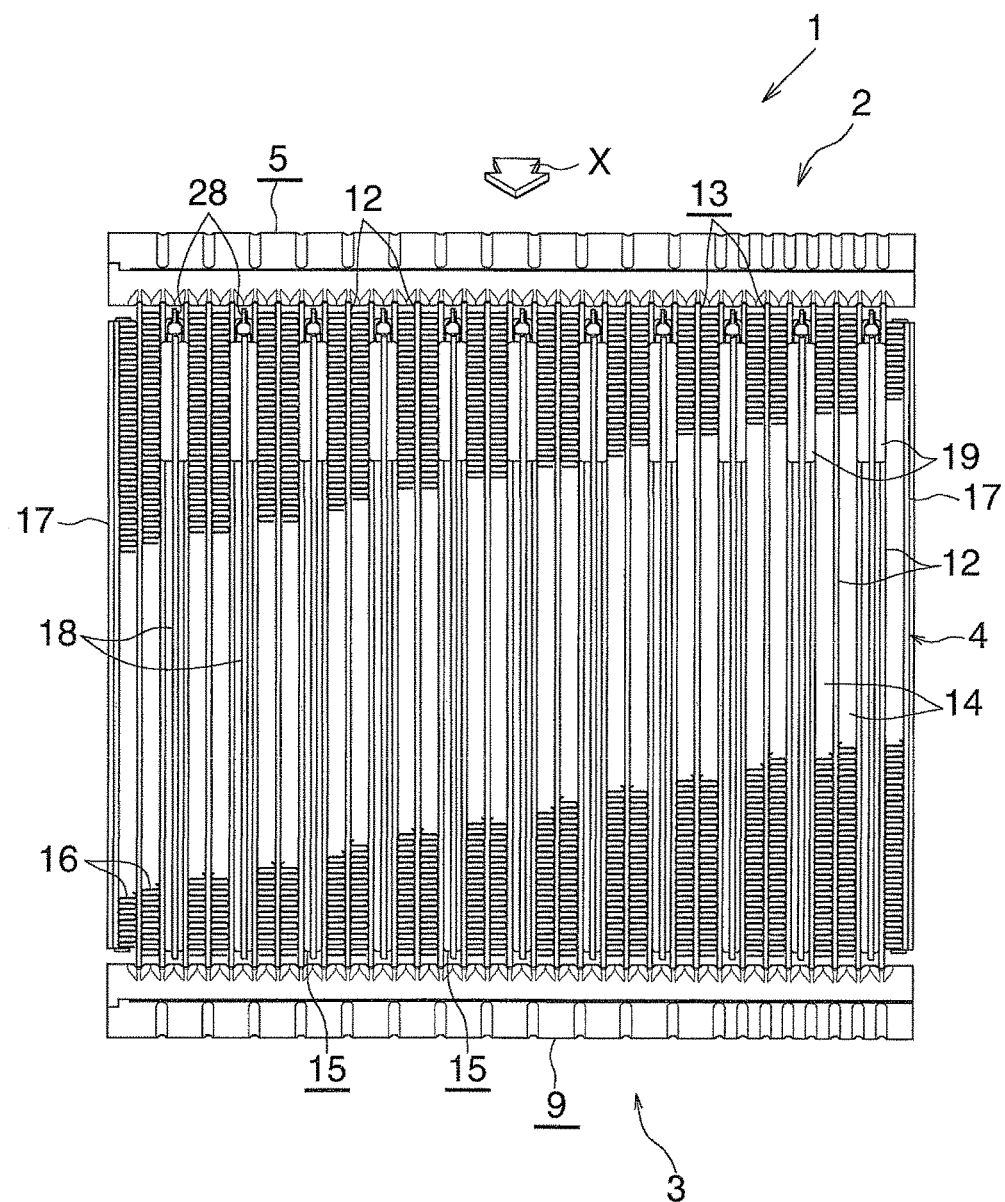
FIG. 2 is a front view showing the overall structure of the evaporator with a cool storage function according to an embodiment of the present invention as viewed from the downstream side in an air-passing direction.

In the present specification, the upper, lower, left-hand, and right-hand sides of FIG. 2 will be referred to as "upper," "lower," "left, and "right," respectively.

Figure 3:
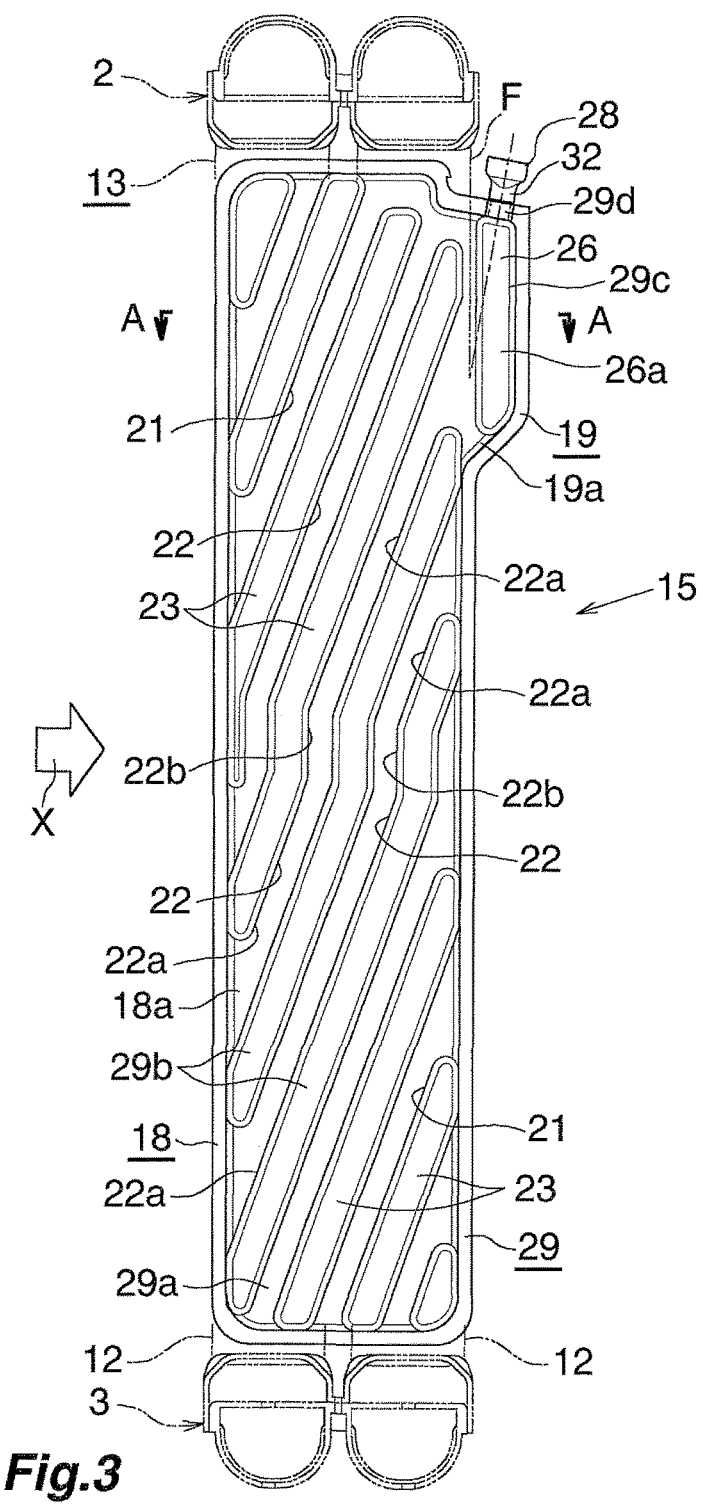
FIG. 3 is a left side view of a cool storage material container used in the evaporator with a cool storage function of FIGS. 1 and 2.

In the following description, the downstream side with respect to an air-passing direction (a direction represented by arrow X in FIGS. 1 through 3) will be referred to as the "front," and the opposite side as the "rear." Accordingly, the upper, lower, left-hand, and right-hand sides of an evaporator as viewed rearward from the front side correspond to the upper, lower, left-hand, and right-hand sides of FIG. 2.

Furthermore, the term "aluminum" as used in the following description encompasses aluminum alloys in addition to pure aluminum.

Figure 1:
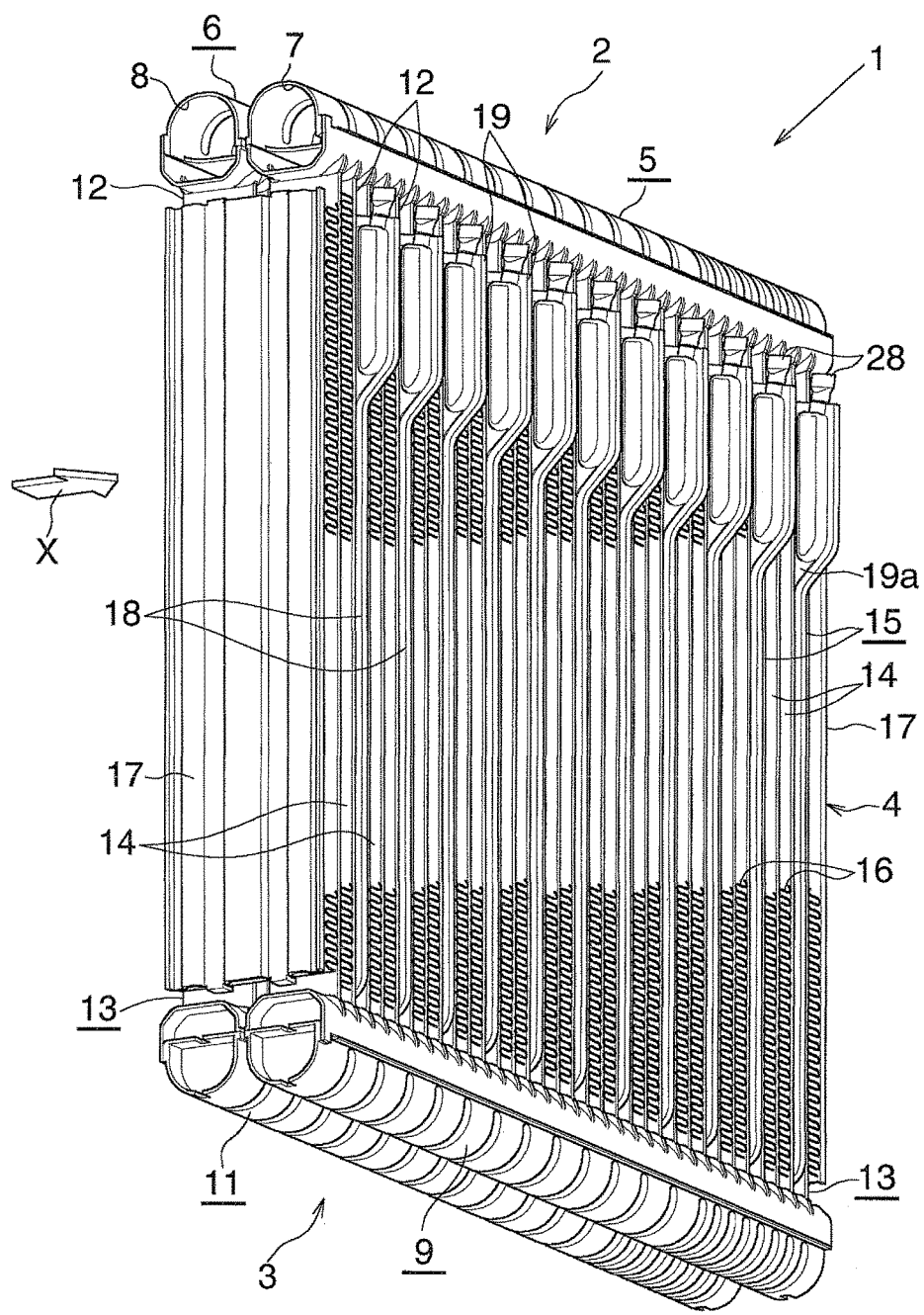
FIG. 1 is a perspective view showing the overall structure of an evaporator with a cool storage function according to an embodiment of the present invention.

FIGS. 1 and 2 show the overall configuration of an evaporator with a cool storage function according to an embodiment of the present invention, and FIGS. 3 to 7 show the configuration of an essential portion of the evaporator.

As shown in FIGS. 1 and 2, an evaporator with a cool storage function 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the left end of the leeward upper header section 5, and a refrigerant outlet 8 is provided at the left end of the windward upper header section 6. The second header tank 3 includes a leeward lower header section 9 located on the front side, and a windward lower header section 11 located on the rear side and united with the leeward lower header section 9.

Figure 4:
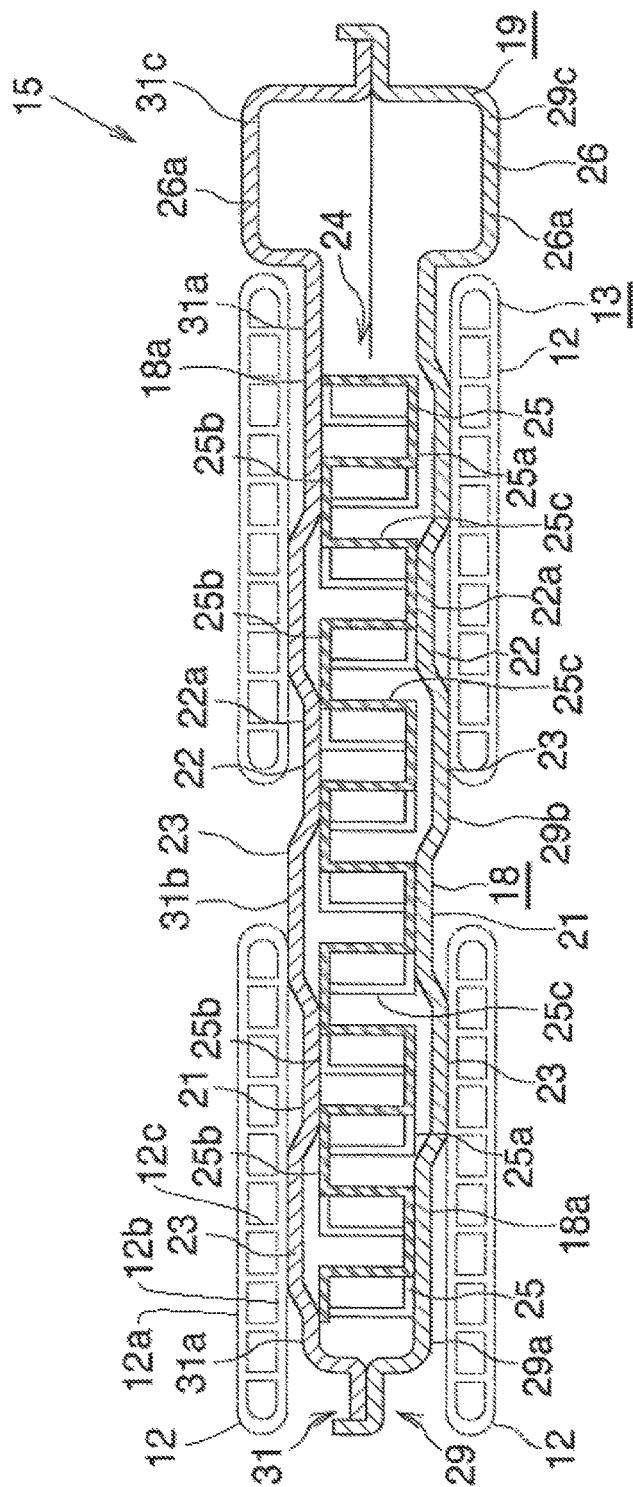
FIG. 4 is an enlarged sectional view taken along line A-A of FIG. 3.

In the heat exchange core section 4, a plurality of flat refrigerant flow tubes 12 which extend in the vertical direction, whose width direction coincides with the air-passing direction (the front-rear direction), and which are formed of aluminum extrudate are disposed in parallel such that they are spaced from one another in the left-right direction (the thickness direction of the refrigerant flow tubes 12). In the present embodiment, a plurality of pairs 13 each composed of two refrigerant flow tubes 12 spaced from each other in the front-rear direction are disposed at predetermined intervals in the left-right direction. A clearance 14 is formed between adjacent two of the pairs 13 each composed of the front and rear refrigerant flow tubes 12. An upper end portion of each front refrigerant flow tube 12 is connected to the leeward upper header section 5, and a lower end portion of each front refrigerant flow tube 12 is connected to the leeward lower header section 9. Similarly, an upper end portion of each rear refrigerant flow tube 12 is connected to the windward upper header section 6, and a lower end portion of each rear refrigerant flow tube 12 is connected to the windward lower header section 11. Each of the refrigerant flow tubes 12 includes a tube wall 12a and a tube wall 12b that are opposite to each other the thickness direction of the refrigerant flow tubes, as shown in FIG. 4. Each of the refrigerant flow tubes 12 includes inner dividing walls 12c connecting the tube wall 12a and the tube wall 12b inside thereof.

A cool storage material container 15 which is formed of aluminum and which is filled with a cool storage material (not shown) is disposed in each of clearances 14 selected from all the clearances 14 of the heat exchange core section 4, the selected clearances 14 being not adjacent from one another, such that the cool storage material container 15 extends over the front and rear refrigerant flow tubes 12. Also, a corrugated outer fin 16 is formed from an aluminum brazing sheet having a brazing material layer on each of opposite surfaces thereof and has crest portions extending in the front-rear direction, trough portions extending in the front-rear direction, and connection portions connecting the crest portions and the trough portions. The corrugated outer fin 16 is disposed in each of the remaining clearances 14 such that the corrugated outer fin 16 extends over the front and rear refrigerant flow tubes 12, and is brazed to the front and rear refrigerant flow tubes 12 of the left-side and right-side pairs 13 which define the clearance 14. In the present embodiment, one outer fin 16 is disposed in each of the clearances 14 adjacently located on the left and right sides of the clearance 14 in which the cool storage material container 15 is disposed, and two outer fins 16 are disposed between the cool storage material containers 15 located adjacent to each other in the left-right direction. Notably, three or more outer fins 16 may be disposed between the cool storage material containers 15 located adjacent to each other in the left-right direction. Also, the outer fin 16, which is formed from an aluminum brazing sheet having a brazing material layer on each of opposite surfaces thereof, is disposed on the outer side of the pair 13 of the refrigerant flow tubes 12 located at the left end, and is disposed on the outer side of the pair 13 of the refrigerant flow tubes 12 located at the right end. These outer fins 16 are brazed to the corresponding front and rear refrigerant flow tubes 12. Furthermore, a side plate 17 formed of aluminum is disposed on the outer side of each of the outer fins 16 located at the left and right ends, respectively, and is brazed to the corresponding outer fin 16.

In the case of the evaporator 1 of the present embodiment, refrigerant passes through the refrigerant inlet 7, enters the leeward upper header section 5 of the evaporator 1, and passes through all the refrigerant flow tubes 12. The refrigerant then flows out of the refrigerant outlet 8 of the windward upper header section 6.

As shown in FIGS. 3 to 6, each cool storage material container 15 is a flat, hollow container disposed such that its longitudinal direction coincides with the vertical direction, and its widthwise direction coincides with the front-rear direction. Each cool storage material container 15 is composed of a container main body portion 18 and an outward projecting portion 19. The container main body portion 18 is located rearward of the front edges of the front refrigerant flow tubes 12, and is brazed to the front and rear (two) refrigerant flow tubes 12 of each of the corresponding pairs 13. The outward projecting portion 19 is continuous with only a portion (an upper portion in the present embodiment) of the front edge (leeward edge) of the container main body portion 18, and projects forward (outward in the air-passing direction) beyond the front edges of the front refrigerant flow tubes 12. A cool storage material charging space is formed in the cool storage material container 15, excluding a peripheral edge portion thereof, such that the cool storage material charging space extends across the container main body portion 18 and the outward projecting portion 19. The outward projecting portion 19 is provided over a predetermined length as measured from the upper end of the front edge of the container main body portion 18, and the length of the outward projecting portion 19 in the vertical direction is shorter than that of the container main body portion 18. The outward projecting portion 19 of the cool storage material container 15 is located outward of the outer fins 16 with respect to the air-passing direction. A lower edge portion 19a of the outward projecting portion 19 slopes downward toward the container main body portion 18 (toward the upstream side with respect to the air-passing direction). In the present embodiment, the thickness of the container main body portion 18 as measured in the left-right direction is equal to that of the outward projecting portion 19.

First and second condensed water drain passages 21 and 22 are formed on the outer surfaces of left and right side walls 18a of the container main body portion 18 of each cool storage material container 15 such that they slope from their upper ends toward their lower ends. In the present embodiment, the entirety of each first condensed water drain passage 21 slopes such that its lower end is located on the windward side in relation to its upper end, and each of the second condensed water drain passages 22 is composed of upper and lower slope portions 22a which are formed to be separated from each other in the vertical direction and which slope such that their lower ends are located on the windward side in relation to their upper ends, and a vertical portion 22b which establishes communication between the lower end of the upper slope portion 22a and the upper end of the lower slope portion 22a. The second condensed water drain passages 22 are formed in a region extending from an upper portion to a lower portion of the container main body portion 18 so as to cover a central portion of the container main body portion 18 in the vertical direction. The upper end of each condensed water drain passage 21, 22 is open at the upper edge or the leeward edge of the container main body portion 18. The lower end of the condensed water drain passage 21 and 22 whose upper end is open at the upper edge of the container main body portion 18 is open at the windward edge of the container main body portion 18, and the lower end of the condensed water drain passage 21 and 22 whose upper end is open at the leeward edge of the container main body portion 18 is open at the lower edge of the container main body portion 18. Each condensed water drain passage 21, 22 is formed between two convex portions 23 bulging outward from each of the left and right side walls 18a of the container main body portion 18 of each cool storage material container 15. At least one of the two convex portions 23 which form a single condensed water drain passage 21, 22 has a length greater than the width of the container main body portion 18 of the cool storage material container 15 as measured in the air-passing direction. Notably, two adjacent condensed water drain passages 21, 22 share a convex portion 23 located between the two condensed water drain passages 21, 22. The bulging top walls of all the convex portions 23 are flat and are located on the same plane. The flat bulging top walls of the convex portions 23 are in contact with and are brazed to the corresponding refrigerant flow tube 12. The condensed water drain passages 21, 22 and the convex portions 23 of the left side wall 18a of the container main body portion 18 are slightly shifted in the air-passing direction from those of the right side wall 18a thereof such that the condensed water drain passages 21, 22 and the convex portions 23 of the left side wall 18a of the container main body portion 18 partially overlap (i.e., do not completely overlap) with those of the right side wall 18a thereof.

Figure 5:
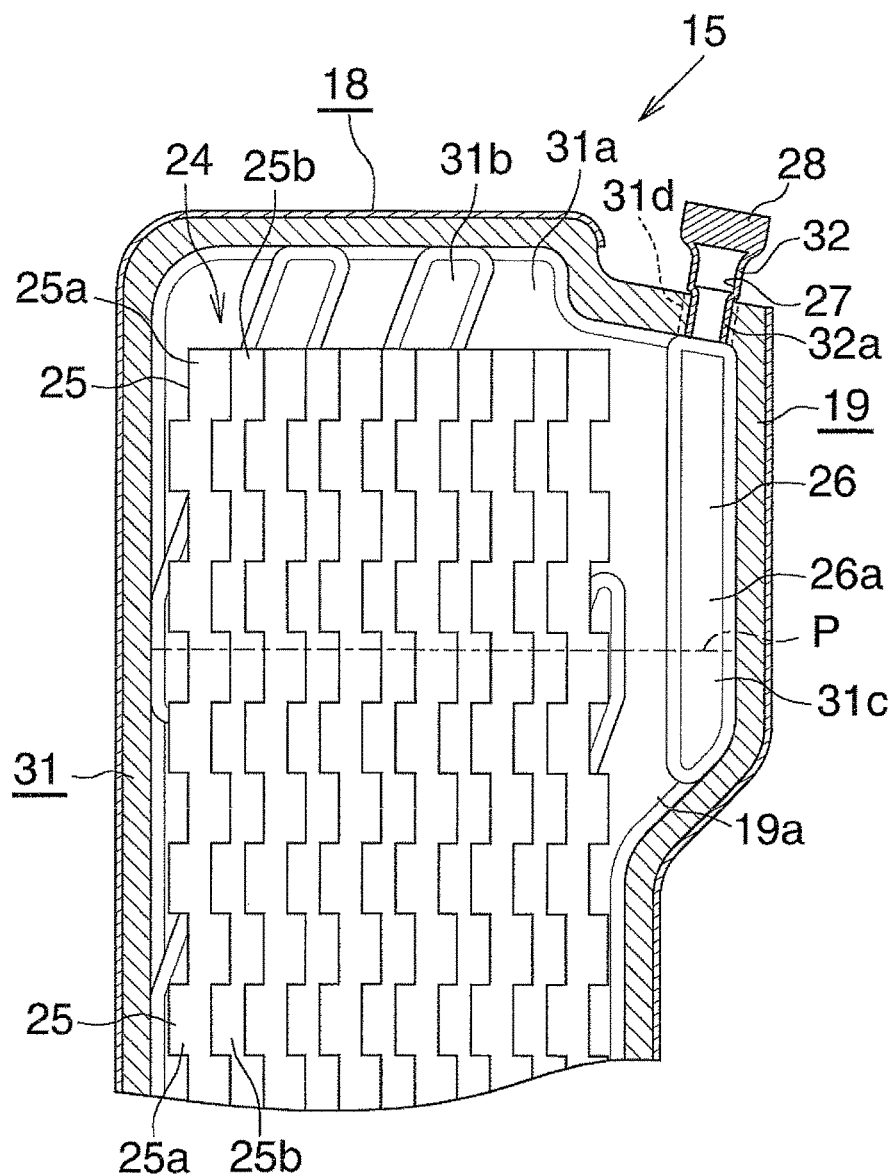
FIG. 5 is a view corresponding to a portion of FIG. 3 and showing an upper portion of a cool storage material container used in the evaporator with a cool storage function of FIGS. 1 and 2, with a metal plate on the left side being cut and removed.

A staggered inner fin 24 formed of aluminum is disposed in the container main body portion 18 of each cool storage material container 15 such that the inner fin 24 extends over substantially the entire container main body portion 18 in the vertical direction. The inner fin 24 is formed by connecting together a plurality of wavy strips 25 that extend in a horizontal direction as shown in FIG. 5 and that are disposed in parallel and adjacent to one another in the vertical direction. Each of the strips 25 has crest portions 25a extending in the vertical direction, trough portions 25b extending in the vertical direction, and connection portions 25c connecting the crest portions 25a and the trough portions 25b. The strips 25 are disposed such that the crest portions 25a and the trough portions 25b of one of two wavy strips 25 located adjacent to each other in the vertical direction are positionally shifted in the front-rear direction from the crest portions 25a and the trough portions 25b of the other wavy strip 25. The crest portions 25a, the trough portions 25b, the connection portions 25c of each wavy strip 25 have the same length in the vertical direction. The inner fin 24 is brazed to the inner surfaces of the left and right side walls 18a of the container main body portion 18 of the cool storage material container 15; i.e., portions of the left and right side walls 18a of the container main body portion 18 where the convex portions 23 are not formed. The bulging top walls of the convex portions 23 are not in contact with the inner fin 24 although the bulging top walls are in contact with the refrigerant flow tubes 12. Therefore, each side wall 18a of the container main body portion 18 of each cool storage material container 15 has contact portions which are in contact with the inner fin 24 and non-contact portions which are not in contact with the inner fin 24.

The outward projecting portion 19 of each cool storage material container 15 has an expansion portion 26 which expands in the left and right directions, excluding a narrow portion thereof located on the inner side with respect to the air-passing direction (on the rear side) so that the dimension of the expansion portion 26 in the left-right direction is greater than that of the container main body portion 18. The expansion portion 26 is located outward of the outer fins 16 with respect to the air-passing direction (on the downstream side in the air-passing direction), and has flat left and right side walls 26a.

A paraffin-based latent heat storage material whose freezing is adjusted to 5° C. to 10° C. is used as a cool storage material which is charged into each cool storage material container 15. Specifically, pentadecane, tetradecane, or the like is used. Preferably, a cool storage material charging ratio (the ratio of the volume of the charged cool storage material to the volume of the internal space of the cool storage material container 15) is set to 70% to 90%. The upper end of the inner fin 24 is preferably located above the upper end P of the cool storage material charged into the cool storage material container 15. In this case, the cool storage material is in contact with the inner fin 24 at all times during cool storage periods during which cool is stored in the cool storage material and during cool release periods during which the cool stored in the cool storage material is released.

The cool storage material is charged into the cool storage material container 15 through a cool storage material charging inlet 27 which is provided in an upper end portion of the outward projecting portion 19 and is opened upward. The cool storage material charging inlet 27 is provided inside a cylindrical tubular charging member 32 which is fixed to the upper end portion of the outward projecting portion 19 and which establishes communication between the interior of the outward projecting portion 19 and the outside thereof. After the cool storage material is charged into the cool storage material container 15, the cool storage material charging inlet 27 is closed by crushing an upper portion of the charging member 32. As a result, a seal portion 28 formed as a result of closing the cool storage material charging inlet 27 is present at the upper end of the outward projecting portion 19. The seal portion 28 projects upward from the upper end of the outward projecting portion 19, and inclines (toward the leeward side in the present embodiment) in relation to an air-passing face F (a surface orthogonal to the air-passing direction; e.g., the front surface of the heat exchange core section 4) of the evaporator 1 such that the distance between the seal portion 28 and the container main body portion 18 increases upward (shown in FIG. 3).

The strength of each cool storage material container 15 is determined such that the cool storage material container 15 does not break within an ordinary use environment temperature range (e.g., within a range of −40° C. to 90° C.) even when the density of the cool storage material in the liquid phase changes and the air remaining in the cool storage material container 15 thermally expands with a resultant increase in the internal pressure.

Figure 6:
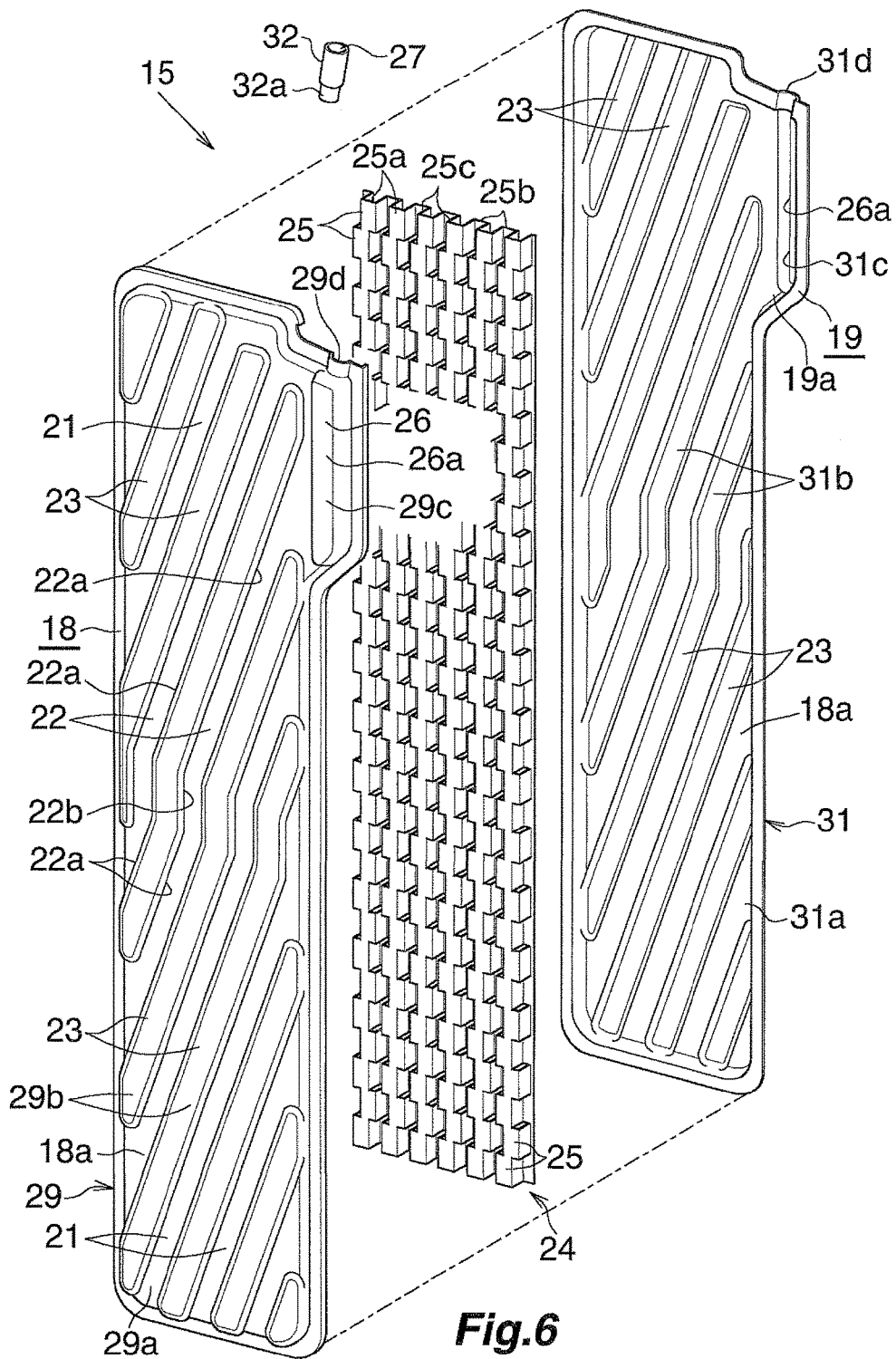
FIG. 6 is an exploded perspective view of the cool storage material container used in the evaporator with a cool storage function of FIGS. 1 and 2.

As specifically shown in FIG. 6, each cool storage material container 15 is composed of two generally rectangular aluminum plates 29 and 31 elongated in the vertical direction. Each of the aluminum plates 29 and 31 is formed by performing press work on an aluminum brazing sheet having a brazing material layer on each of opposite sides thereof. Peripheral edge portions of the aluminum plates 29 and 31 are brazed to each other. The aluminum plates 29 and 31, excluding strip-shaped peripheral edge portions thereof, are bulged outward so as to form first bulging portions 29a and 31a which form the container main body portion 18 and the outward projecting portion 19 and which have the same bulging height; second bulging portions 29b and 31b which are formed on the bulging top walls of portions of the first bulging portions 29a and 31a, the portions forming the container main body portion 18, and which are to become the convex portions 23; third bulging portions 29c and 31c which are formed on the bulging top walls of portions of the first bulging portions 29a and 31a, the portions forming the outward projecting portion 19, and which are to become the expansion portion 26; and semi-cylindrical-tubular fourth bulging portions 29d and 31d which extend upward from the upper ends of the third bulging portions 29c and 31c and which establish communication between the interiors of the third bulging portions 29c and 31c and the external space.

Each of the aluminum plates 29 and 31 may be pressed by using a split die composed of upper dies for forming the first condensed water drain passages 21 located above the vertical portions 22b of the second condensed water drain passages 22, the upper slope portions 22a of the second condensed water drain passages 22, and upper portions of the vertical portions 22b of the second condensed water drain passages 22; lower dies for forming the first condensed water drain passages 21 located below the vertical portions 22b of the second condensed water drain passages 22, the lower slope portions 22a of the second condensed water drain passages 22, and lower portions of the vertical portions 22b of the second condensed water drain passages 22; and intermediate dies for forming the remaining portions of the vertical portions 22b of the second condensed water drain passages 22. Such a split die makes it possible to form aluminum plates having different heights by exchanging the intermediate dies only.

The two aluminum plates 29 and 31 are combined with the inner fin 24 interposed therebetween such that the openings of the first bulging portions 29a and 31a face each other and a small diameter portion 32a of the charging member 32 provided at the lower end thereof is sandwiched between the fourth bulging portions 29d and 31d. In this state, the peripheral edge portions of the two aluminum plates 29 and 31 are brazed together, and the two aluminum plates 29 and 31 and the charging member 32 are brazed together, whereby the cool storage material container 15 is formed. The cool storage material is charged into the cool storage material container 15 through the cool storage material charging inlet 27 inside the charging member 32 whose upper portion has not yet been crushed. The cool storage material flows through the clearances each formed between two vertically adjacent wavy strips 25 of the staggered inner fin 24 and fills the entire space within the cool storage material container 15. After completion of the charging of the cool storage material, the cool storage material charging inlet 27 is closed by crushing the upper portion of the charging member 32, whereby the seal portion 28 is formed. The cool storage material charged into the cool storage material container 15 through the cool storage material charging inlet 27 first enters the outward projecting portion 19, and then enters the container main body portion 18. Since the lower edge portion 19a of the outward projecting portion 19 slopes downward toward the container main body portion 18, the cool storage material charged into the outward projecting portion 19 of the cool storage material container 15 through the cool storage material charging inlet 27 flows into the container main body portion 18 more easily.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front refrigerant flow tubes 12, and flows out from the refrigerant outlet 8 of the windward upper header section 6. When the refrigerant flows through the refrigerant flow tubes 12, the refrigerant performs heat exchange with air passing through the clearances 14, and flows out in a vapor phase.

When the compressor is operating, the cool carried by the refrigerant flowing through the refrigerant flow tubes 12 is transferred directly to the cool storage material within each cool storage material container 15 from the bulging top walls of the convex portions 23 of the left and right side walls 18a of the container main body portion 18 of the cool storage material container 15, the bulging top walls being brazed to the corresponding refrigerant flow tubes 12. Also, the cool is transferred from the bulging top walls of the convex portions 23 to the entire cool storage material within the cool storage material container 15 through the inner fin 24 and portions of the left and right side walls 18a, which portions are not brazed to the refrigerant flow tubes 12. Thus, the cool is stored in the cool storage material.

At that time, condensed water produced on the surface of each cool storage material container 15 enters the condensed water drain passages 21 and 22, and, due to surface tension, accumulates within the condensed water drain passages 21 and 22, along the convex portions 23 on the opposite sides of the condensed water drain passages 21 and 22. When the amount of the condensed water accumulated within the condensed water drain passages 21 and 22 increases, the gravitational force acting on the accumulated, condensed water becomes greater than the surface tension, and the accumulated, condensed water flows downward at once through the condensed water drain passages 21 and 22. Accordingly, the time over which the condensed water remains in the condensed water drain passages 21 and 22 becomes shorter, and the condensed water produced on the outer surface of each cool storage material container 15 can be drained smoothly.

When the compressor stops, the cool stored in the cool storage material within each cool storage material container 15 is transferred directly to the refrigerant flow tubes 12 from the bulging top walls of the convex portions 23 of the left and right side walls 18a of the container main body portion 18 of the cool storage material container 15, the bulging top walls being brazed to the corresponding refrigerant flow tubes 12. The stored cool is also transferred from the inner fin 24 to the refrigerant flow tubes 12 through the portions of the left and right side walls 18a, which portions are not brazed to the refrigerant flow tubes 12, and the bulging top walls of the convex portions 23. The cool then passes through the refrigerant flow tubes 12 and propagates to the outer fins 16 brazed to the sides of the refrigerant flow tubes 12 opposite the cool storage material container 15. Subsequently, the cool is transferred via the outer fins 16 to air passing through the clearances 14 adjacently located on the opposite sides of the clearance 14 in which the cool storage material container 15 is disposed. Accordingly, even when the temperature of air having passed through the evaporator 1 increases, the air is cooled, so that a sharp drop in the cooling capacity can be prevented.

Figure 7:
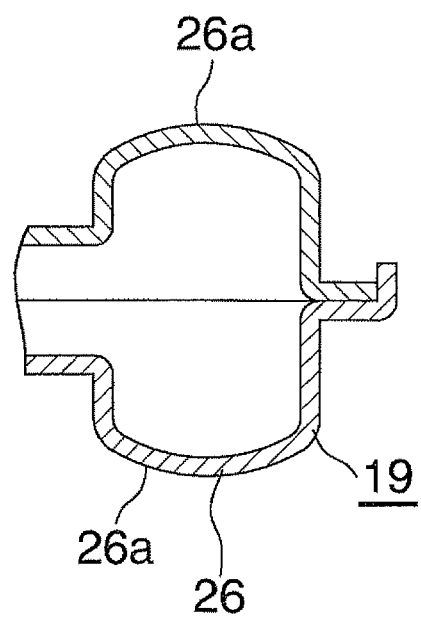
FIG. 7 is a view corresponding to a portion of FIG. 4 and showing a state in which the internal pressure of the cool storage material container used in the evaporator with a cool storage function of FIGS. 1 and 2 has increased abnormally.

When the ambient temperature becomes higher than the ordinary use environment temperature range (for example, becomes 100° C.), the change in the density of the cool storage material in the liquid phase and the thermal expansion of air remaining in the cool storage material container 15 become remarkable, and the internal pressure of the cool storage material container 15 increases abnormally. However, in this case, as shown in FIG. 7, the left and right side walls 26a of the expansion portion 26 provided on the outward projecting portion 19 of the cool storage material container 15 deform to expand outward, whereby breakage of the cool storage material container 15 due to an increase in the internal pressure is prevented. In addition, since the strength of the outward projecting portion 19 projecting toward the leeward side in relation to the outer fins 16 is lower than the strength of the container main body portion 18 brazed to the refrigerant flow tubes 12, when the ambient temperature increases further, the cool storage material container 15 may break at the outward projecting portion 19 with resultant leakage of the cool storage material. However, since the refrigerant flow tubes 12 are not affected by the breakage of the cool storage material container 15, breakage of the refrigerant flow tubes 12 is prevented. In addition, since leakage of the cool storage material occurs at a fixed (same) position, measures against the leaked cool storage material can be taken relatively simply.

Incidentally, even when the cool storage material within each cool storage material container 15 is in the liquid phase, the connection portions 25c of the wavy strips 25 of the inner fin 24 restrict the cool storage material from greatly moving in the air-passing direction within the cool storage material container 15. Therefore, generation of an unnatural sound due to large movement of the cool storage material within the cool storage material containers 15 is restrained.

Figure 8:
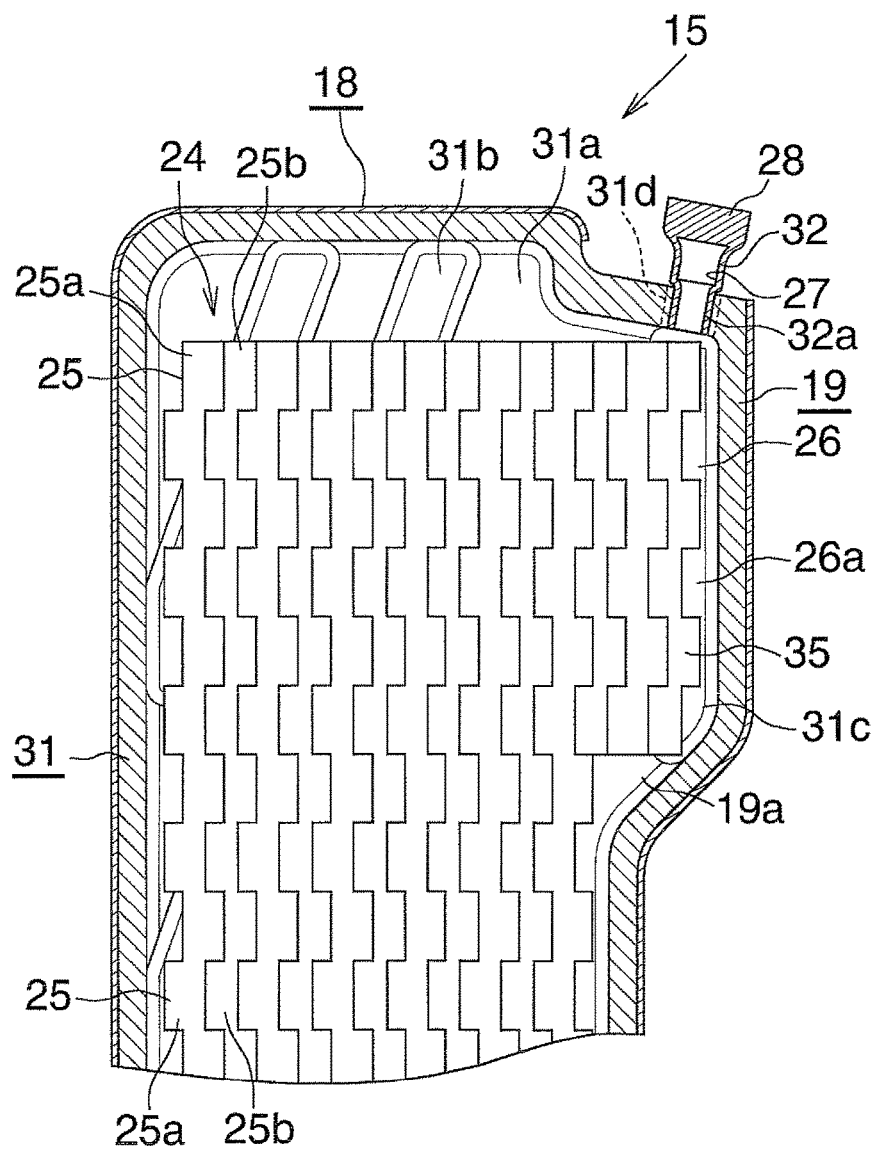
FIG. 8 is a view corresponding to FIG. 5 and showing a modification of the cool storage material container used in the evaporator with a cool storage function of FIGS. 1 and 2.

FIG. 8 shows a modification of the inner fin disposed in each cool storage material container of the evaporator with a cool storage function according to an embodiment of the present invention.

An inner fin 24 shown in FIG. 8 has an extension portion 35 which extends from the container main body portion 18 to the outward projecting portion 19.

Figure 9:
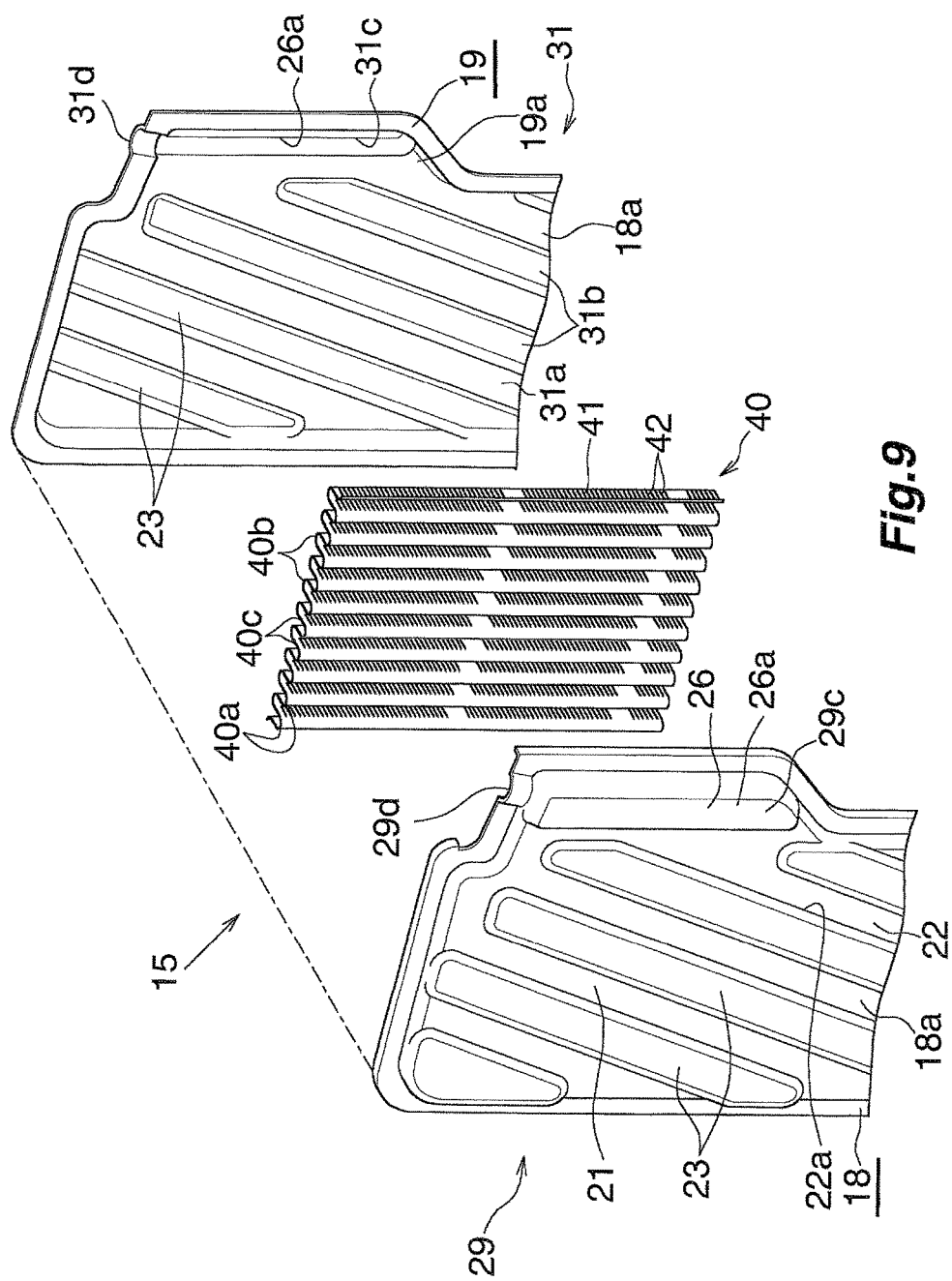
FIG. 9 is a view corresponding to a portion of FIG. 6 and showing another modification of the cool storage material container used in the evaporator with a cool storage function of FIGS. 1 and 2.

FIG. 9 shows another modification of the inner fin disposed in each cool storage material container of the evaporator with a cool storage function according to an embodiment of the present invention.

An inner fin 40 shown in FIG. 9 is formed of aluminum and is disposed in the container main body portion 18 of each cool storage material container 15. The inner fin 40 is a corrugated fin which has crest portions 40a extending in the vertical direction, trough portions 40b extending in the vertical direction, and connection portions 40c connecting the crest portions 40a and the trough portions 40b. A plurality of louvers 41 extending in the left-right direction are provided on each of the connection portions 40c of the inner fin 40 such that the louvers 41 are spaced from one another in the vertical direction, whereby through-holes 42 are formed in each of the connection portions 40c. The crest portions 40a, the trough portions 40b, and the connection portions 40c of the inner fin 40 have the same length in the vertical direction.

When the cool storage material is charged into the cool storage material container 15 having the inner fin 40 through the cool storage material charging inlet 27 inside the charging member 32 whose upper portion has not yet been crushed, the cool storage material flows through the through-holes 42 formed in the connection portions 40c of the inner fin 40 and fills the entire space within the cool storage material container 15.

In the inner fin 40 shown in FIG. 9, instead of forming the through-holes in the connection portions 40c by providing the louvers 41, the through-holes may be formed by partially punching the connection portions 40c.

Although not illustrated, the inner fin 40 shown in FIG. 9 may have an extension portion 35 which is integrally provided such that the extension portion 35 extends from the container main body portion 18 to the outward projecting portion 19.

Even in the case where either of the inner fins 24 and 40 shown in FIGS. 8 and 9 is used, the upper end of the inner fin 24, 40 is preferably located above the upper end of the cool storage material charged into the cool storage material container 15.

In the evaporator with a cool storage function according to the embodiment, the inner fin disposed within the cool storage material container has crest portions extending in the vertical direction, trough portions extending in the vertical direction, and connection portions connecting the crest portions and the trough portions. Therefore, by the action of the connection portions, the cool storage material within the cool storage material container is restricted from greatly moving in the air-passing direction. Accordingly, generation of an unnatural sound due to large movement of the cool storage material within the cool storage material container is restrained.

In the evaporator with a cool storage function according to the embodiment, the cool storage material is in contact with the inner fin at all times during cool storage periods during which cool is stored in the cool storage material and during cool release periods during which the cool stored in the cool storage material is released. Therefore, the evaporator has an improved cool storage efficiency and an improved cool release efficiency.

In the evaporator with a cool storage function according to the embodiment, when the cool storage material is charged into the cool storage material container, for example, through a cool storage material charging inlet provided on the outward projecting portion, the cool storage material flows through the clearances each formed between two vertically adjacent wavy strips of the staggered inner fin and fills the entire space within the cool storage material container.

In the evaporator with a cool storage function according to the embodiment, when the cool storage material is charged into the cool storage material container, for example, through a cool storage material charging inlet provided on the outward projecting portion, the cool storage material flows through the through-holes formed in the connection portions of the corrugated inner fin and fills the entire space within the cool storage material container.

In the case where the cool storage material container has a container main body portion joined to the corresponding refrigerant flow tubes, and an outward projecting portion which is continuous with the leeward edge or windward edge of the container main body portion such that the outward projecting portion projects beyond the refrigerant flow tubes in the air-passing direction, the cool storage material moves not only within the container main body portion but also between the container main body portion and the outward projecting portion.

In the evaporator with a cool storage function according to the embodiment, the inner fin within the cool storage material container has an integrally formed extension portion which extends to the outward projecting portion. Therefore, even in the case where the cool storage material container has a container main body portion joined to the corresponding refrigerant flow tubes, and an outward projecting portion which is continuous with the leeward edge or windward edge of the container main body portion such that the outward projecting portion projects beyond the refrigerant flow tubes in the air-passing direction, the movement of the liquid-phase cool storage material between the container main body portion and the outward projecting portion of the cool storage material container can be restricted effectively.

In the evaporator with a cool storage function according to the embodiment, when the internal pressure of the cool storage material container increases abnormally, the flat side wall (of the left and right side walls) of the expansion portion of the outward projecting portion deforms to expand outward, whereby breakage of the cool storage material container due to an abnormal increase in the internal pressure of the cool storage material container is prevented.

In the evaporator with a cool storage function according to the embodiment, the amount of the cool storage material present in the outward projecting portion which is not in direct contact with the refrigerant flow tubes can be reduced, whereby a portion of all the cool storage material charged into the cool storage material container, which portion is not cooled effectively, can be reduced in amount. Namely, the strength of the cool storage material container and the cool storage material charging ratio (the ratio of the volume of the charged cool storage material to the volume of the internal space of the cool storage material container) are designed such that the cool storage material container does not break within the ordinary use environment temperature rang (e.g., within a range of −40° C. to 90° C.) even when the density of the cool storage material in the liquid phase changes and the air remaining in the cool storage material container thermally expands with a resultant increases in the internal pressure. Since such a cool storage material charging ratio is of course less than 100%, a space which is not occupied by the cool storage material is present near the upper end of the cool storage material container. Therefore, the entire interior of the outward projecting portion provided over a predetermined length from the upper end of the leeward edge or windward edge of the container main body portion is not filled with the cool storage material. As a result, the amount of the cool storage material not cooled effectively (of all the cool storage material charged into the cool storage material container) can be reduced.

In the evaporator with a cool storage function according to the embodiment, when the cool storage material is charged into the cool storage material container, for example, through a cool storage material charging inlet provided on the outward projecting portion, the cool storage material easily flows into the container main body portion. Therefore, the cool storage material can be changed into cool storage material container quickly.

In the evaporator with a cool storage function according to the embodiment, the operation of charging the cool storage material into the cool storage material container through the cool storage material charging inlet and the operation of closing the cool storage material charging inlet are facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. An evaporator with a cool storage function, the evaporator comprising:
   a first refrigerant flow tube including a first tube wall and a second tube wall opposite to the first tube wall in a thickness direction of the first refrigerant flow tube, the first refrigerant flow tube including inner dividing walls connecting the first tube wall and the second tube wall inside the first refrigerant flow tube;
   a second refrigerant flow tube including a third tube wall and a fourth tube wall opposite to the third tube wall in the thickness direction, the first refrigerant flow tube and the second refrigerant flow tube being arranged such that the second tube wall is opposite to the third tube wall in the thickness direction;
   a cool storage material container containing a cool storage material therein and including a first container wall and a second container wall opposite to the first container wall in the thickness direction, the first container wall having first base portions and first convex portions projecting from the first base portions toward an outside of the cool storage material container in the thickness direction, the second container wall having second base portions and second convex portions projecting from the second base portions toward the outside of the cool storage material container in the thickness direction, the first base portions overlapping with the second convex portions when viewed in the thickness direction, the cool storage material container being provided between the first refrigerant flow tube and the second refrigerant flow tube such that the first convex portions contact the second tube wall of the first refrigerant flow tube and the second convex portions contact the third tube wall of the second refrigerant flow tube; and an inner fin provided inside the cool storage material container to contact the first base portions which do not contact the second tube wall of the first refrigerant flow tube, and not to contact the second convex portions which contact the third tube wall of the second refrigerant flow tube, wherein the first refrigerant flow tube and the second refrigerant flow tube have a longitudinal direction and a width direction perpendicular to the longitudinal direction, the longitudinal direction and the width direction being perpendicular to the thickness direction, and wherein the cool storage material container has first drain passages on an outer surface thereof, the first drain passages are provided on the first container wall and defined between adjacent first convex portions at the first base portions, the first drain passages longitudinally extending at an inclined orientation with respect to the width direction along which air is to pass through the evaporator.

2. The evaporator according to claim 1, further comprising:

a third refrigerant flow tube provided to oppose the first tube wall of the first refrigerant flow tube; and outer fins provided between and joined to the first refrigerant flow tube and the third refrigerant flow tube.

3. The evaporator according to claim 1, wherein the inner fin includes crest portions and trough portions.

4. The evaporator according to claim 1, wherein the inner fin includes crest portions, trough portions, and connection portions, the connection portions extend in the thickness direction to connect the crest portions and the trough portions, and wherein the crest portions and trough portions are connected alternatingly in the width direction.

5. The evaporator according to claim 4, wherein an upper end of the inner fin is located above an upper end of the cool storage material charged into the cool storage material container when the evaporator is oriented such that the longitudinal direction extends substantially along the vertical direction.

6. The evaporator according to claim 1, wherein at least one first base portion among the first base portions, which is opposite to the second tube wall of the first refrigerant flow tube and which does not contact the second tube wall, overlaps with at least two of the inner dividing walls of the first refrigerant flow tube when viewed in the thickness direction.

7. The evaporator according to claim 1, wherein the cool storage material container is made of metal.

8. The evaporator according to claim 7, wherein the cool storage material container is made of aluminum or aluminum alloys.

9. The evaporator according to claim 1, wherein the cool storage material container has second drain passages on the outer surface thereof, the second drain passages are provided on the second container wall between adjacent second convex portions at the second base portions, the second drain passages longitudinally extending at an inclined orientation with respect to the width direction.

10. The evaporator according to claim 1, wherein the first drain passages extend to a bottom of the cool storage material container in order to drain water.

11. The evaporator according to claim 1, wherein the first drain passages have open bottom end outlets in order to drain water.

12. The evaporator according to claim 1, wherein the first drain passages includes at least one passage portion that extends in the longitudinal direction without inclining with respect to the longitudinal direction.

* * * * *